(12) United States Patent
Masurekar et al.

(10) Patent No.: US 11,178,229 B2
(45) Date of Patent: Nov. 16, 2021

(54) METHOD AND APPARATUS FOR AUTOMATED DETERMINATION BETWEEN PROXIED AND BYPASSED PROXY CONNECTIONS

(71) Applicant: VMware, Inc., Palo Alto, CA (US)

(72) Inventors: Uday Masurekar, Sunnyvale, CA (US); Sergii Stepanenko, Sunnyvale, CA (US); Todd Sabin, Morganville, NJ (US); Gabe Rosas, Euless, TX (US)

(73) Assignee: VMWARE, INC., Palo Alto, CA (US)

( * ) Notice: Subject to any disclaimer, the term of this patent is extended or adjusted under 35 U.S.C. 154(b) by 102 days.

(21) Appl. No.: 16/523,938

(22) Filed: Jul. 26, 2019

(65) Prior Publication Data

US 2021/0029201 A1      Jan. 28, 2021

(51) Int. Cl.
*H04L 29/08*       (2006.01)
*H04L 29/12*       (2006.01)
(52) U.S. Cl.
CPC ........ *H04L 67/141* (2013.01); *H04L 61/2007* (2013.01); *H04L 67/1097* (2013.01); *H04L 67/28* (2013.01)

(58) Field of Classification Search
CPC ... H04L 67/141; H04L 67/28; H04L 61/2007; H04L 67/1097
See application file for complete search history.

(56) References Cited

U.S. PATENT DOCUMENTS

| | | | |
|---|---|---|---|
| 2006/0039340 A1* | 2/2006 | Ptasinski | H04W 8/22 370/338 |
| 2015/0269203 A1* | 9/2015 | Baldwin | G06F 16/2228 707/741 |
| 2017/0195427 A1* | 7/2017 | Choquette | H04L 61/2007 |
| 2020/0074106 A1* | 3/2020 | Narayanaswamy | G06F 16/285 |
| 2020/0177544 A1* | 6/2020 | McCarty | H04L 63/1433 |
| 2020/0382615 A1* | 12/2020 | Lifshitz | G06F 9/45558 |

* cited by examiner

*Primary Examiner* — Oanh Duong
(74) *Attorney, Agent, or Firm* — Loza & Loza, LLP

(57) ABSTRACT

System and computer-implemented method in a cloud architecture including a mixed network having local objects in a local network and external objects in an external network, wherein the external objects are accessed through proxy communications, uses a proxy inventory to determine whether a connection from a first computing object to a second computing object should be excluded from a proxy. The connection from the first computing object to the second computing object is performed based on the determination.

18 Claims, 10 Drawing Sheets

FIG. 4

| object | object_type | proxy_enabled | last_used |
|---|---|---|---|
| Identity_1 | Type_1 | true | Time_1 |
| Identity_2 | Type_2 | false | Time_2 |
| All | Type_3 | false | Time_3 |
| ... | ... | ... | ... |
| Identity_x | Type_n | false | Time_x |

FIG. 5

| object | object_type | proxy_enabled | last_used |
|---|---|---|---|
| VCENTER-1 | VMWARE VCENTER | NO | (example) |
| OPS-1 | OPENSTACK NEUTRON SERVER | YES | (example) |
| MS-SVC-1 | MICROSOFT SYSTEM CENTER | NO | (example) |
| HCX-ID-1 | PEER HCX MANAGER | YES | (example) |
| HCX-IX-1 | HCX INTERCONNECT APPLIANCES | NO | (example) |
| ESX-1 | VMWARE ESX HOST | NO | (example) |
| KVM-HOST-1 | KVM HOSTS | NO | (example) |
| AUTH-1 | KERBEROS AUTHENTICATION SERVER | NO | (example) |
| SAS-1 | HCX-CENTRAL-SAAS | NO | (example) |
| VA-AN-1 | ANALYTICS CLOUD | YES | (example) |

METHOD AND APPARATUS FOR AUTOMATED DETERMINATION BETWEEN PROXIED AND BYPASSED PROXY CONNECTIONS

BACKGROUND

Cloud architectures are used in cloud computing and cloud storage systems for offering infrastructure as a service (IaaS) cloud services. Examples of cloud architectures include the VMware Cloud architecture software, Amazon EC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs, such as virtual computing instances (VCIs), e.g., virtual machines (VMs), and logical networks.

The services described above may be provided for a private cloud that includes one or more customer data centers (referred to herein as "on-premise data centers"). The services may also be provided for a public cloud that includes a multi-tenant cloud architecture providing IaaS cloud services. A hybrid cloud system aggregates the resource capability from both private and public clouds to facilitate creation, deployment, maintenance, and utilization of customer application with minimal effort of access to those capabilities. In other words, a hybrid cloud system abstracts private, on-premises, and public cloud resources and presents them as being available in one continuous, hybrid cloud. Customers can then deploy applications over the resources offered by the hybrid cloud to take advantage of scaling and flexibility.

Cloud systems typically have applications with multiple components deployed across different sites. Moreover, these components include subcomponents deployed in every site as well. These components and subcomponents have to communicate with each other as well as with rest of the infrastructure over various paths. However, placement of these components is defined by end-users and therefore intra-component communication is dependent on firewall and proxy configurations that exist on every site. Traditionally, users have to define proxy configuration for every site and also specify which of the paths should use a proxy and which paths should not, the latter paths being added to a proxy exclude list.

A proxy configuration typically contains a list of Internet Protocol (IP) addresses of the objects that should be excluded from the proxy communication. However, the proxy configuration is subject to change over time for various reasons. For example, as user infrastructure undergoes modifications—where objects are created, modified, and/or deleted; the proxy configuration should also be updated to reflect changes in the IPs of the excluded objects. Currently, a user needs to carry out these steps manually, which is time consuming and subject to error as well as add delays to establishing intra-component communications.

SUMMARY

System and computer-implemented method in a cloud architecture including a mixed network having local objects in a local network and external objects in an external network, wherein the external objects are accessed through proxy communications, uses a proxy inventory to determine whether a connection from a first computing object to a second computing object should be excluded from a proxy. The connection from the first computing object to the second computing object is performed based on the determination.

A computer-implemented method in a cloud architecture comprising a mixed network including local objects in a local network and external objects in an external network, wherein the external objects are accessed through proxy communications in accordance with an embodiment of the invention includes detecting a connection request by a first computing object to create a connection to a second computing object; querying a proxy inventory based on the connection request; determining whether the connection should be excluded from a proxy based on the query; and performing the connection based on the determination. In some embodiments, the steps of this method are performed when program instructions contained in a computer-readable storage medium are executed by one or more processors.

A system in a cloud architecture having a mixed network including local objects in a local network and external objects in an external network, wherein the external objects are accessed through proxy communications, the system including memory and one or more processors configured to detect a connection request by a first computing object to create a connection to a second computing object; query a proxy inventory based on the connection request; determine whether the connection should be excluded from a proxy based on the query; and perform the connection based on the determination.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIG. 4 is an example of an object inventory configured in accordance with an embodiment of the invention that may be used with the proxy connection determination manager of FIG. 2.

FIG. 5 is a more specific example of an object inventory configured in accordance with an embodiment of the invention that may be used with the proxy connection determination manager of FIG. 2.

Throughout the description, similar reference numbers may be used to identify similar elements.

DETAILED DESCRIPTION

Figure 1:
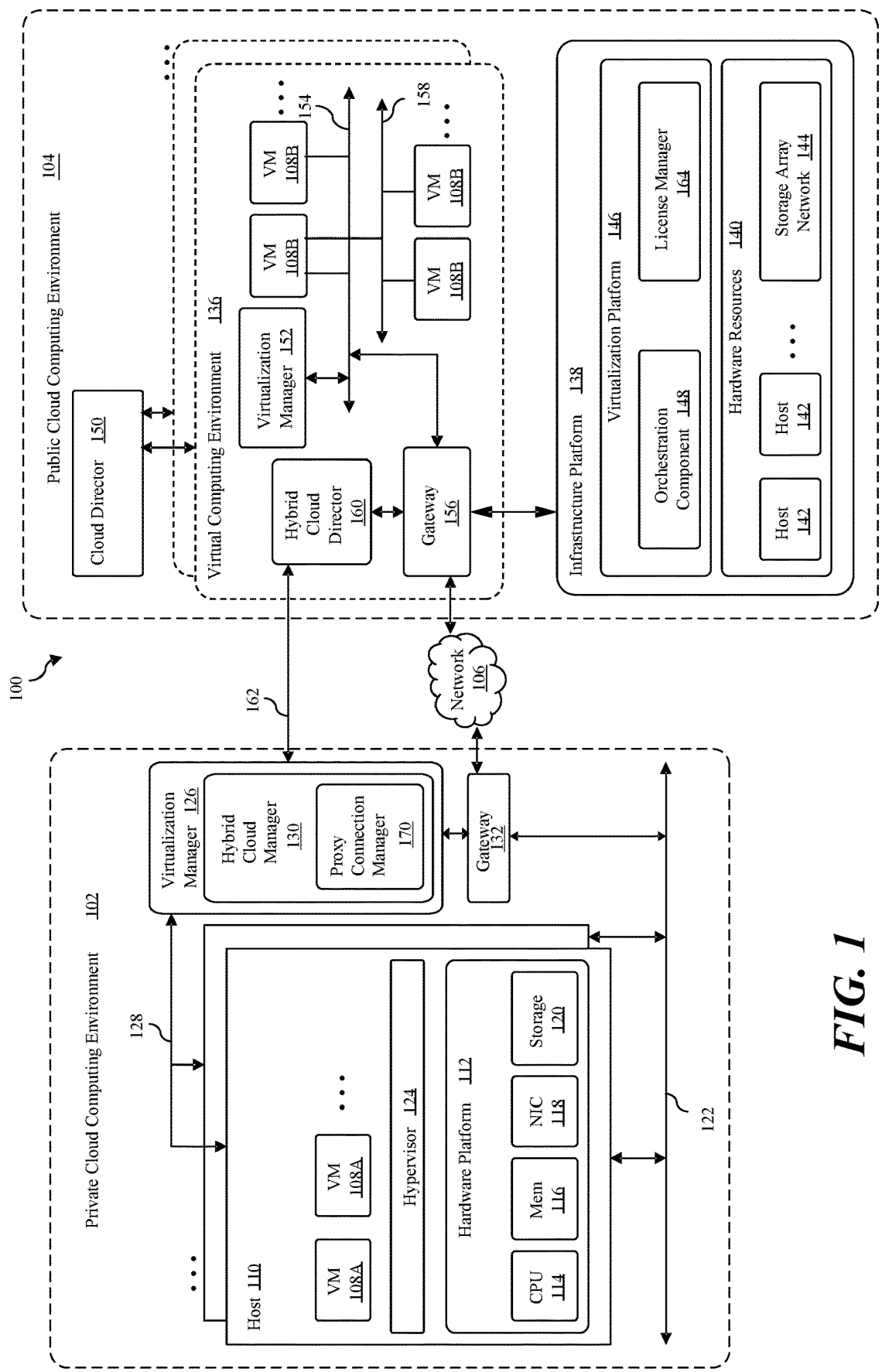
FIG. 1 is a block diagram of a hybrid cloud system that may be used to describe a method and apparatus for agentless platform-agnostic application topology discovery configured in accordance with various aspects of the invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," "one aspect," "an aspect," "various aspects," or similar language means that a particular feature, structure, or characteristic described in connection with the indicated embodiment is included in at least one embodiment of the present invention. Thus, the phrases "in one embodiment," "in an embodiment," "in one aspect," "in an aspect," "in various aspects," and similar language throughout this specification may, but do not necessarily, all refer to the same embodiment.

In a hybrid cloud network, certain communications between objects need to go through a proxy. As used herein, objects that do not need to go through a proxy to be accessed may be referred to as local objects. External objects are objects that needs to go through the proxy to be accessed. Typically, when a user configures the proxy, communications between the local objects are excluded from the proxy because they do not need to go through a proxy. In other words, connections to internal objects do not need to involve the proxy to establish a connection. These exclusions are contained in a proxy configuration. The exclusion in the proxy configuration is complicated by the fact that some of the internal components are accessible via either an IP address or a domain name. For a complex network topology where there are different subnets for different components, the proxy configuration may be even more complex.

Instead of having to manually create proxy configurations in the form of IP addresses (simply, "IP"), Classless Inter-Domain Routing (CIDR) notation (simply, "CIDR"), or domain names, in one aspect of the invention the method and apparatus for automated determination between proxied and bypassed proxy connections disclosed herein directly uses objects and object types that are defined in the cloud architecture to automate creation and maintenance of proxy configurations. In one aspect of the invention, the cloud architecture includes an inventory (e.g., database) of objects and their associated types in the cloud architecture. This inventory contains information about every object in the cloud architecture, such as the identity of hosts and its IPs. The inventory may also include information about objects that are planned to be deployed. Further, the inventory may be kept up-to-date by virtue of synchronization, which may be triggered periodically, automatically based on one or more criterion, or manually. By defining proxy configurations through use of objects and object types, user-involved operations may be simplified to a great extent where the method and apparatus for automated determination between proxied and bypassed proxy connections takes care of translating these rule definitions is in a form as best used by the user (e.g., objects and object types) to a form as understood by the proxy engine (e.g., CIDR/IP).

In another aspect of the invention, the method and apparatus for automated determination between proxied and bypassed proxy connections may include a learning (i.e., try-and-use) approach. In this approach, a proxy location may be specified but a user does not have to explicitly define rules as to which communications the proxies should be applied. Instead, a proxy detection module maintains a cache (e.g., database) that contains a list of connections and action for whether connections should be sent over proxy or should be sent directly (i.e., bypassing the proxy config). When a component attempts to open a connection, the connection will be attempted through the examination of a cache and, as further detailed herein. In accordance with various aspects of this invention, use of the cache may remove a need for any user configuration for which connections should go over proxy versus which should not. Instead, the user only has to define proxy locations, which simplifies proxy configuration to a great extent. In essence, a connectivity map may be created through the learning approach.

As used herein, the terms "objects" or "computing objects" may refer to applications, services, hosts, components, sub-components, or any other entity that may communicate with other entities in the cloud architecture, and for which a proxy may be used. These may include hosts and appliances implemented using virtualization technologies provided by VMware, Inc., including VCIs created using VMware ESXi™-based hypervisors. However, objects may be implemented using any other virtualization technologies, including Xen®, Microsoft Hyper-V® and/or Docker virtualization technologies.

Turning now to FIG. 1, a block diagram of a hybrid cloud system 100 in accordance with an embodiment of the invention is shown. The hybrid cloud system 100 includes at least one private cloud computing environment 102 and at least one public cloud computing environment 104 that are connected via a network 106. The hybrid cloud system 100 is configured to provide a common platform for managing and executing workloads seamlessly between the private and public cloud computing environments. In one embodiment, the private cloud computing environment 102 may be controlled and administrated by a particular enterprise or business organization, while the public cloud computing environment 104 may be operated by a cloud computing service provider and exposed as a service available to account holders, such as the particular enterprise in addition to other enterprises. In some embodiments, the private cloud computing environment 102 may be a private or on-premise data center.

The private cloud computing environment 102 and public cloud computing environment 104 of the hybrid cloud system 100 include computing and/or storage infrastructures to support a number of virtual computing instances 108A and 108B. As used herein, the term "virtual computing instance" refers to any software processing entity that can run on a computer system, such as a software application, a software process, a virtual machine (VM), e.g., a VM supported by virtualization products of VMware, Inc., and a software "container", e.g., a Docker container. However, in this disclosure, the virtual computing instances will be described as being virtual machines, although embodiments of the invention described herein are not limited to virtual machines.

Continuing to refer to FIG. 1, the private cloud computing environment 102 of the hybrid cloud system 100 includes one or more host computer systems ("hosts") 110. The hosts may be constructed on a server grade hardware platform 112, such as an x86 architecture platform. As shown, the hardware platform of each host may include conventional components of a computing device, such as one or more processors (e.g., CPUs) 114, system memory 116, a network interface 118, storage system 120, and other I/O devices such as, for example, a mouse and a keyboard (not shown). The processor 114 is configured to execute instructions such as, for example, executable instructions that may be used to perform one or more operations described herein and may be stored in the memory 116 and the storage system 120. The memory 116 is volatile memory used for retrieving programs and processing data. The memory 116 may include, for example, one or more random access memory (RAM) modules. The network interface 118 enables the host 110 to communicate with another device via a communication medium, such as a network 122 within the private cloud computing environment. The network interface 118 may be one or more network adapters, also referred to as a Network Interface Card (NIC). The storage system 120 represents local storage devices (e.g., one or more hard disks, flash memory modules, solid state disks and optical disks) and/or a storage interface that enables the host to communicate with one or more network data storage systems. Example of a storage interface is a host bus adapter (HBA) that couples the host to one or more storage arrays, such as a storage area network (SAN) or a network-attached storage (NAS), as well as other network data storage systems. The storage system 120 is used to store information, such as executable instructions, cryptographic keys, virtual disks, configurations and other data, which can be retrieved by the host.

Each host 110 may be configured to provide a virtualization layer that abstracts processor, memory, storage, and networking resources of the hardware platform 112 into the virtual computing instances, e.g., the virtual machines 108A, that run concurrently on the same host. The virtual machines run on top of a software interface layer, which is referred to herein as a hypervisor 124, that enables sharing of the hardware resources of the host by the virtual machines. One example of the hypervisor 124 that may be used in an embodiment described herein is a VMware ESXi™ hypervisor provided as part of the VMware vSphere® solution made commercially available from VMware, Inc. The hypervisor 124 may run on top of the operating system of the host or directly on hardware components of the host. For other types of virtual computing instances, the host may include other virtualization software platforms to support those virtual computing instances, such as Docker virtualization platform to support software containers.

The private cloud computing environment 102 includes a virtualization manager 126 that communicates with the hosts 110 via a management network 128. In one embodiment, the virtualization manager 126 is a computer program that resides and executes in a computer system, such as one of the hosts, or in a virtual computing instance, such as one of the virtual machines 108A running on the hosts. One example of the virtualization manager 126 is the VMware vCenter Server® product made available from VMware, Inc. The virtualization manager 126 is configured to carry out administrative tasks for the private cloud computing environment, including managing the hosts, managing the VMs running within each host, provisioning VMs, migrating VMs from one host to another host, and load balancing between the hosts.

The virtualization manager 126 includes a hybrid cloud manager 130. In general, the hybrid cloud manager 130 is responsible for managing and integrating computing resources provided by the private cloud computing environment 102 with computing resources provided by the public cloud computing environment 104 to form a unified "hybrid" computing platform. The hybrid cloud manager 130 may further be configured to deploy virtual computing instances, e.g., virtual machines 108A, in the private cloud computing environment; transfer VMs from the private cloud computing environment to the public cloud computing environment; and perform other "cross-cloud" administrative tasks.

The hybrid cloud manager 130 is configured to control network traffic into the network 106 via a gateway device 132, which may be implemented as a virtual appliance. The gateway device 132 is configured to provide the virtual machines 108A and other devices in the private cloud computing environment 102 with connectivity to external devices via the network 106. The gateway device 132 may manage external public Internet Protocol (IP) addresses for the virtual machines 108A and route traffic incoming to and outgoing from the private cloud computing environment and provide networking services, such as firewalls, network address translation (NAT), dynamic host configuration protocol (DHCP), load balancing, and virtual private network (VPN) connectivity over the network 106.

The hybrid cloud manager 130 includes a proxy connection manager 170 configured to manage connections between various objects that may utilize a proxy connection. The hybrid cloud manager 130 manages objects in the private cloud computing environment 102, which are considered local objects. Local objects can communicate with each other directly, without going through a proxy. Thus, objects that do not need to go through a proxy to be accessed may be referred to as local or internal objects. External objects are objects that needs to go through the proxy to be accessed. Specifically, connections to internal objects should be excluded from the proxy. Connections to external objects need to go through the proxy. In accordance with various aspects of the invention, the hybrid cloud manager 130 also controls network traffic with regards to communications between local objects and external objects. The hybrid cloud manager 130 includes a proxy manager 170 configured to manage proxy communications using a proxy, as further described herein.

In one implementation, the hybrid cloud manager 130 is a module or plug-in to the virtualization manager 126, although other implementations may be used, such as a separate computer program executing in any computer system or running in a virtual machine in one of the hosts. One example of the hybrid cloud manager 130 is the VMware® HCX™ product made available from VMware, Inc.

The public cloud computing environment 104 of the hybrid cloud system 100 is configured to dynamically provide an enterprise (or users of an enterprise) with one or more virtual computing environments 136 in which an administrator of the enterprise may provision virtual computing instances, e.g., the virtual machines 108B, and install and execute various applications in the virtual computing instances. The public cloud computing environment includes an infrastructure platform 138 upon which the virtual computing environments can be executed. In the particular embodiment of FIG. 1, the infrastructure platform includes hardware resources 140 having computing resources (e.g., hosts 142), storage resources (e.g., one or more storage array systems, such as a storage area network (SAN) 144), and networking resources (not illustrated), and a virtualization platform 146, which is programmed and/or configured to provide the virtual computing environments 136 that support the virtual machines 108B across the hosts 142. The virtualization platform may be implemented using one or more software programs that reside and execute in one or more computer systems, such as the hosts 142, or in one or more virtual computing instances, such as the virtual machines 108B, running on the hosts.

In one embodiment, the virtualization platform 146 includes an orchestration component 148 that provides infrastructure resources to the virtual computing environments 136 responsive to provisioning requests. The orchestration component may instantiate VMs according to a requested template that defines one or more VMs having specified virtual computing resources (e.g., compute, networking and storage resources). Further, the orchestration component may monitor the infrastructure resource consumption levels and requirements of the virtual computing environments and provide additional infrastructure resources to the virtual computing environments as needed or desired. In one example, similar to the private cloud computing environment 102, the virtualization platform may be implemented by running, on the hosts 142, VMware ESXi™-based hypervisor technologies provided by VMware, Inc. However, the virtualization platform may be implemented using any other virtualization technologies, including Xen®, Microsoft Hyper-V® and/or Docker virtualization technologies, depending on the virtual computing instances being used in the public cloud computing environment 104.

In one embodiment, the public cloud computing environment 104 may include a cloud director 150 that manages allocation of virtual computing resources to an enterprise. The cloud director may be accessible to users via a REST (Representational State Transfer) API (Application Programming Interface) or any other client-server communication protocol. The cloud director may authenticate connection attempts from the enterprise using credentials issued by the cloud computing provider. The cloud director receives provisioning requests submitted (e.g., via REST API calls) and may propagate such requests to the orchestration component 148 to instantiate the requested virtual machines (e.g., the virtual machines 108B). One example of the cloud director is the VMware vCloud Director® product from VMware, Inc. The public cloud computing environment 104 may be VMware cloud (VMC) on Amazon Web Services (AWS).

In one embodiment, at least some of the virtual computing environments 136 may be configured as virtual data centers. Each virtual computing environment includes one or more virtual computing instances, such as the virtual machines 108B, and one or more virtualization managers 152. The virtualization managers 152 may be similar to the virtualization manager 126 in the private cloud computing environment 102. One example of the virtualization manager 152 is the VMware vCenter Server® product made available from VMware, Inc. Each virtual computing environment may further include one or more virtual networks 154 used to communicate between the virtual machines 108B running in that environment and managed by at least one networking gateway device 156, as well as one or more isolated internal networks 158 not connected to the gateway device 156. The gateway device 156, which may be a virtual appliance, is configured to provide the virtual machines 108B and other components in the virtual computing environment 136 with connectivity to external devices, such as components in the private cloud computing environment 102 via the network 106. The gateway device 156 operates in a similar manner as the gateway device 132 in the private cloud computing environment.

In one embodiment, each virtual computing environments 136 includes a hybrid cloud director 160 configured to communicate with the corresponding hybrid cloud manager 130 in the private cloud computing environment 102 to enable a common virtualized computing platform between the private and public cloud computing environments. The hybrid cloud director may communicate with the hybrid cloud manager using Internet-based traffic via a VPN tunnel established between the gateways 132 and 156, or alternatively, using a direct connection 162. The hybrid cloud director and the corresponding hybrid cloud manager facilitate cross-cloud migration of virtual computing instances, such as virtual machines 108A and 108B, between the private and public computing environments. This cross-cloud migration may include both "cold migration" in which the virtual machine is powered off during migration, as well as "hot migration" in which the virtual machine is powered on during migration.

In accordance with various aspects of the invention, the proxy connection manager 170 manages proxy communications over the network 122, the management network 128, and the direct connection 162. As described in this disclosure, in general communications between local objects do not need to be transmitted over a proxy and thus these types of communications should be excluded (from the proxy). Thus, the proxy connection manager 170 manages communications that need to be sent over a proxy connection, the act of which will also be referred to herein as being "proxied."

Figure 2:
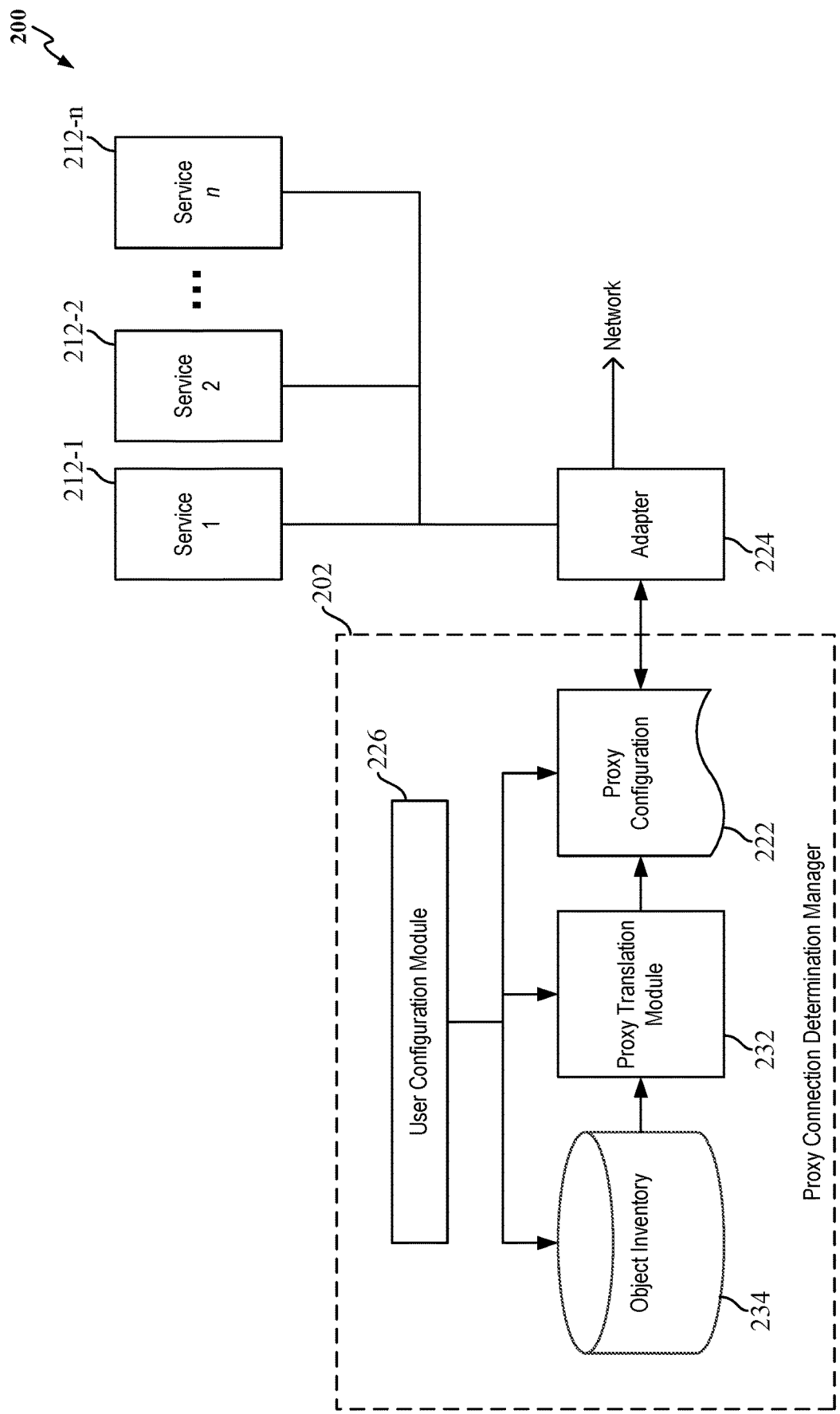
FIG. 2 is a block diagram of a proxy connection determination manager including a proxy translation module and an object inventory, configured in accordance with various aspects of the invention.

FIG. 2 illustrates a proxy connection determination manager 202 in a hybrid cloud manager 200 configured in accordance with an embodiment of the invention that may be used to implement proxy communications with the proxy connection determination manager 170 within the hybrid cloud manager 130 in FIG. 1. In one aspect of the invention, functionality described for the proxy determination manager 202 may be implemented as microservices running under the hybrid cloud manager 200. The proxy connection determination manager 202 includes a proxy configuration 222 that is used by an adapter 224 for determining whether any connections initiated by a plurality of services 212-1, 212-2, and 212-n will be sent over a proxy connection, or proxied. All of these services communicate through the adapter 224, which will refer to the proxy configuration 222 and then make outbound calls as necessary.

Figure 3:
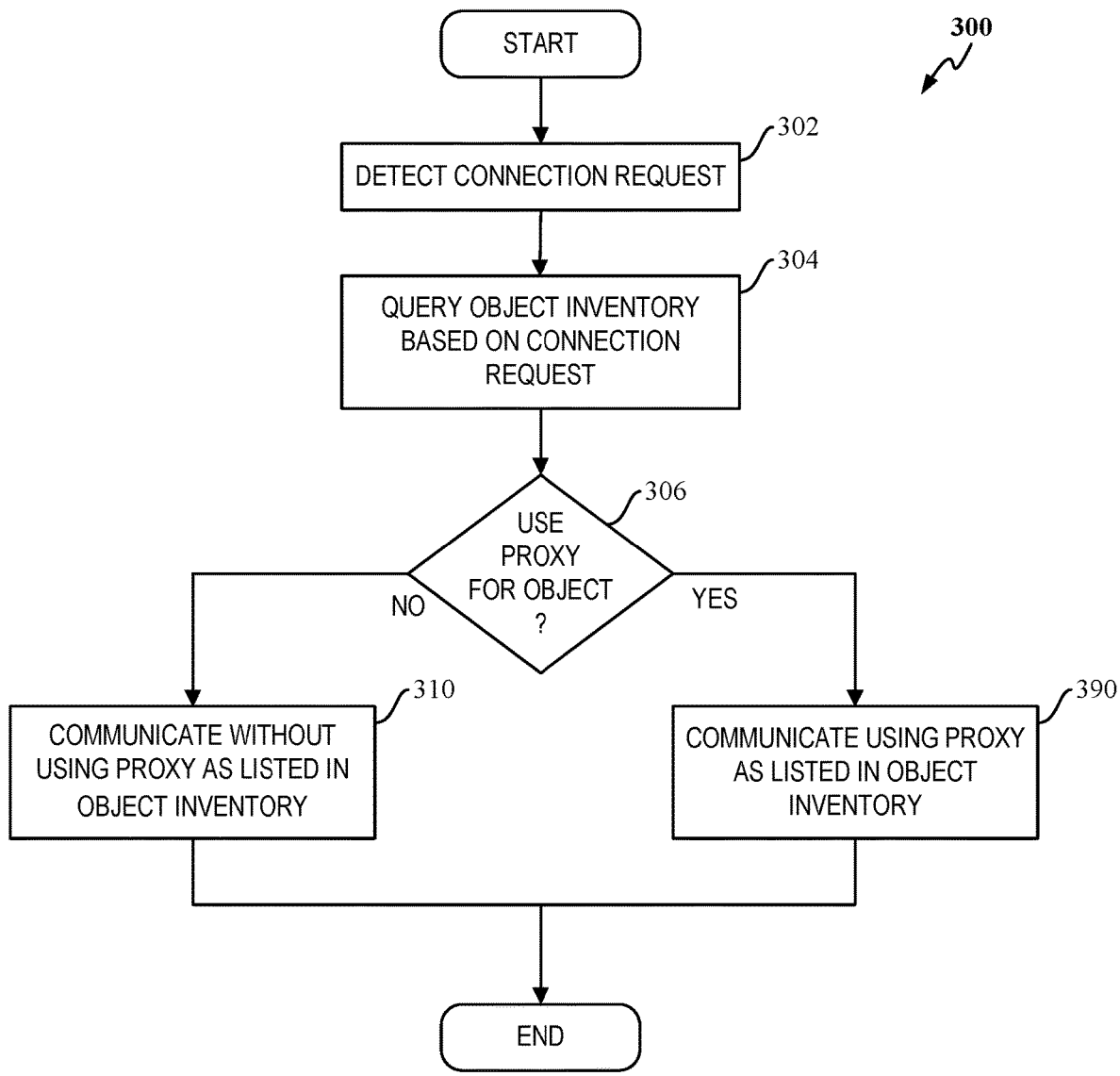
FIG. 3 is a flow diagram of a proxy communication determination approach using the proxy connection determination manager of FIG. 2.

The proxy connection determination manager 202 includes a proxy translation module 232 and an object inventory 234. In describing the proxy translation module 232, reference will also be made to FIG. 3 that illustrates a proxy communication determination approach 300 configured in accordance with various aspects of the invention that provides for proxy configuration based on objects and object types where, at 302, a connection request from an object, including a service such as one of the plurality of services 212-1, 212-2, and 212-n is detected. Operation then continues with 304.

At 304, the proxy translation module 232 performs a query of the object inventory 234 based on the connection request. FIG. 4 illustrates a object inventory 400 that may represent an example of the object inventory 234 at a particular time. In one embodiment of the invention, an entry in the object inventory 400 may be defined, on a per row basis, with the fields and values of:

```
{
    object: {identity},
    object_type: {object type},
    proxy_enabled: {true|false},
    last_used: {time}
}
``` where the object field of {identity} may identify an object, which may be a unique identification number; the object type field {object type} may list a type of the object; the proxy_enabled field of {true/false} may be a Boolean of true or false, where a true value means that the proxy should be used; and the last_used field of {time} may specify a particular time that the particular entry in the object inventory 400 has been used.

In accordance with various aspects of the invention, instead of a time value at which a particular entry in the object inventory 400 has been used, the last_used field of {time} may represent an elapsed time since the entry has been used. Various formats of the last_used field of {time} may be used, depending on the needs of a particular implementation, and those of ordinary skill in the art may appropriately configure the field suitably.

Continuing to refer to FIG. 4, the object inventory 400 includes a first object inventory entry 412_1 with an object field having a value of Identity_1; a object_type field with a value of Type_1; a proxy_enabled field having a value of true, and a last_used field having a value of Time_1. The object inventory 400 also includes a second object inventory entry 412_2 with an object field having a value of Identity_2; an object_type field with a value of Type_2; a proxy_enabled field having a value of false, and a last_used field having a value of Time_2. The object inventory 400 further includes a third object inventory entry 412_3 with an object field having a value of All, signifying it applies to all object types identified in the next field, which is an object_type field with a value of Type_3; a proxy_enabled field having a value of false, and a last_used field having a value of Time_3. In the example, the route inventory 400 includes multiple entries that extend to a x-th route inventory entry 412_x with an object field having a value of Identity_x, an object_type field with a value of Type_n, a proxy_enabled field having a value of false, and a last_used field of Time_x.

In general, the object types that may be used for the object_type field may include hypervisors, virtualization managers, gateways, peer managers, depot services, etc. It should be understood that any type of object that may need to access the network through a proxy may be included. By way of example and not limitation, FIG. 5 provides a more specific example of the object inventory, shown as an object inventory 500 with example values for the object, object_type, and proxy_enabled fields. No specific examples are provided for the last_used field, but those of ordinary skill in the art should be able to benefit from the object inventory 500 without that detail.

At 306, if the entry in the object inventory 234 corresponding to the connection request indicates that the proxy should be used (i.e., proxy_enabled=true), then operation continues to 390. Otherwise, operation continues to 310.

At 390, where the entry in the object inventory 234 that corresponding to the connection request indicates that the proxy should be used, the connection proceeds with use of the proxy. Specifically, the proxy translation module 232 will use the entry in the object inventory 234 to configure the proxy configuration 222 so that the connection is made without the proxy. The adapter 224 will then use the proxy configuration 222 as its proxy configuration.

At 310, where the entry in the object inventory 234 that corresponding to the connection request indicates that the proxy should not be used, the connection proceeds without the use of the proxy. Specifically, the proxy translation module 232 will use the entry in the object inventory 234 to configure the proxy configuration 222 so that the connection is made without the proxy. The adapter 224 will then use the proxy configuration 222 as its proxy exclusion configuration.

Figure 6:
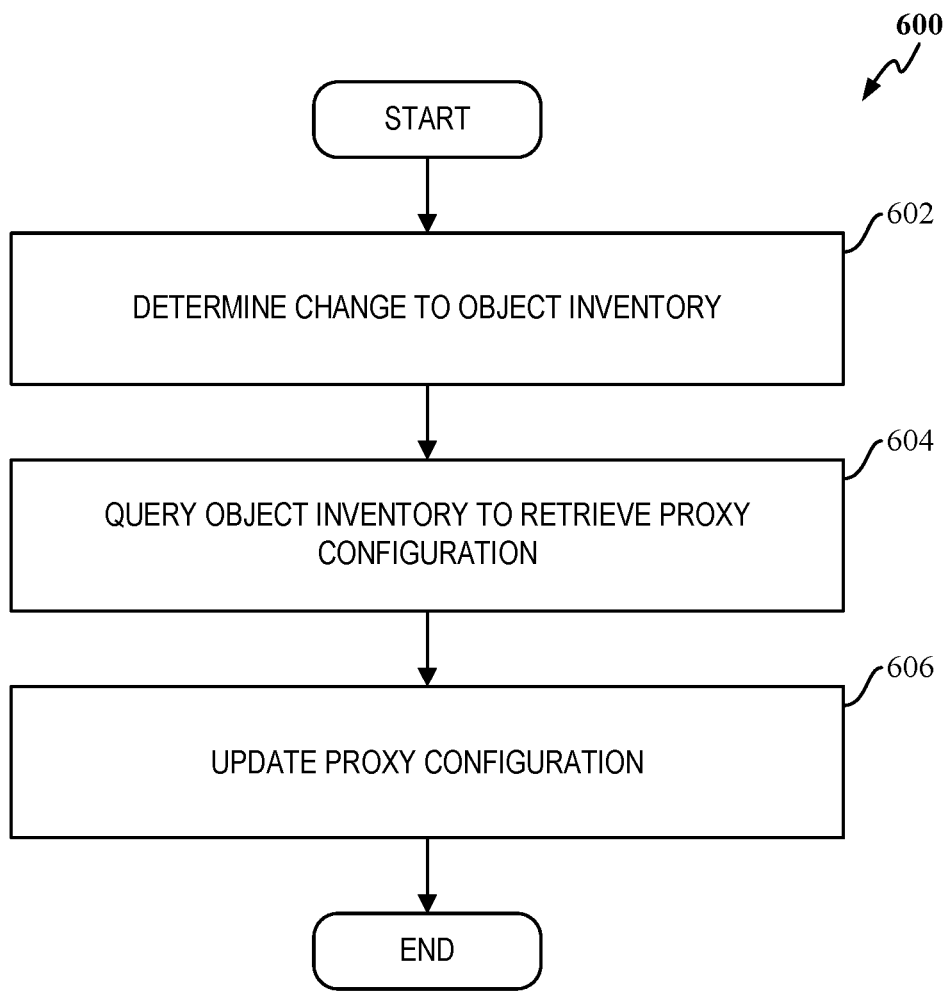
FIG. 6 is a flow diagram of another proxy communication determination approach using the proxy connection determination manager of FIG. 2.

In one aspect of the invention, as described above in the object/object-type-based proxy configuration of the proxy communication determination approach 300, the proxy configuration 222 may be changed each time a connection request is made. In another aspect of the invention, as illustrated by a proxy configuration process 600 in FIG. 6, the proxy configuration 622 is updated when objects are added or removed from the cloud architecture where, at 602, a change to the object inventory 634 is determined. The change may be determined by periodic scan to determine when an object is added or removed, or when an entry is manually added or removed by a user. A change may include a change of an object type. Once a change has been detected, operation then continues with 604.

At 604, the proxy translation module 232 will query the object inventory 234 and retrieve the proxy configuration corresponding to the changed object or object type specified thereby. Operation then continues to 606.

At 606, the proxy configuration 222 will be changed to reflect the changed object inventory.

After the proxy configuration process 600 completes, the adapter 224 may use the proxy configuration 222 for any communications.

In addition to the various aspects of the invention described above for configuring the proxy configuration 222, the proxy connection determination manager 202 also includes a user configuration module 226 that is configured to allow a user to update the proxy configuration 222, the proxy translation module 232, and the object inventory 234. In one aspect of the invention, the user configuration module 226 allows the user to retrieve a current configuration and manually modify (e.g., add/delete/change) entries in either the object inventory 234 or the proxy configuration 222. In another aspect of the invention, the user configuration module 226 allows the user to modify the operation of the proxy translation module 232. For example, the user configuration module 226 allows the user to select between the proxy configuration determination/update operation described by the proxy communication determination approach 300 or the proxy configuration process 600.

Figure 7:
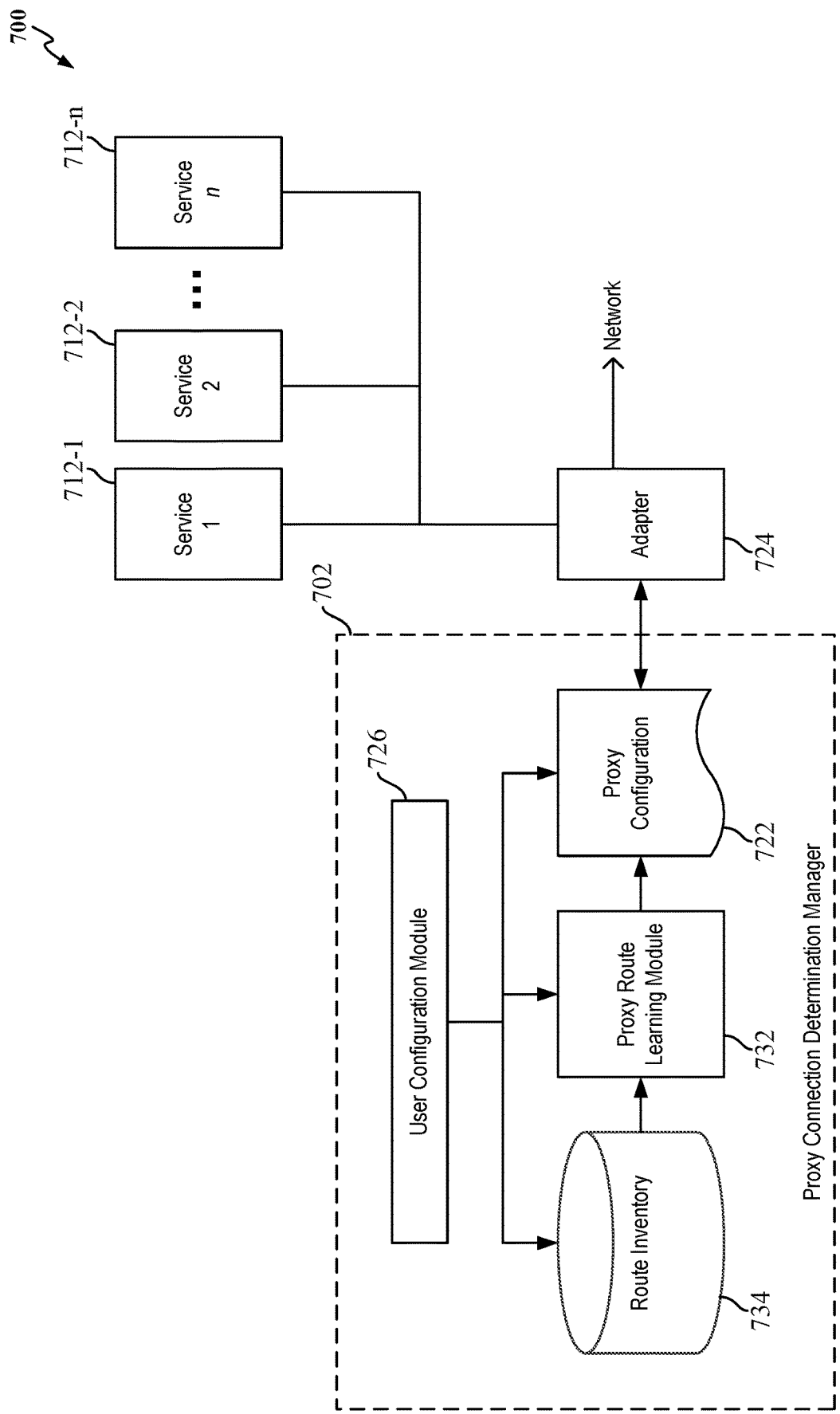
FIG. 7 is a block diagram of a proxy connection determination manager including a proxy route learning module and a route inventory, configured in accordance with various aspects of the invention.

FIG. 7 illustrates a proxy connection determination manager 702 in a hybrid cloud manager 700 configured in accordance with an embodiment of the invention that may be used to implement proxy communications with the proxy connection determination manager 170 within the hybrid cloud manager 130 in FIG. 1. In one aspect of the invention, functionality described for the proxy determination manager 702 may be implemented as microservices running under the hybrid cloud manager 700. The proxy connection determination manager 702 includes a proxy configuration 722 that is used by an adapter 724 for determining whether any connections initiated by a plurality of services 712-1, 712-2, and 712-n will be sent over a proxy connection. All of these services communicate through the adapter 724, which will refer to the proxy configuration 722 and then make outbound calls as necessary.

Figure 8:
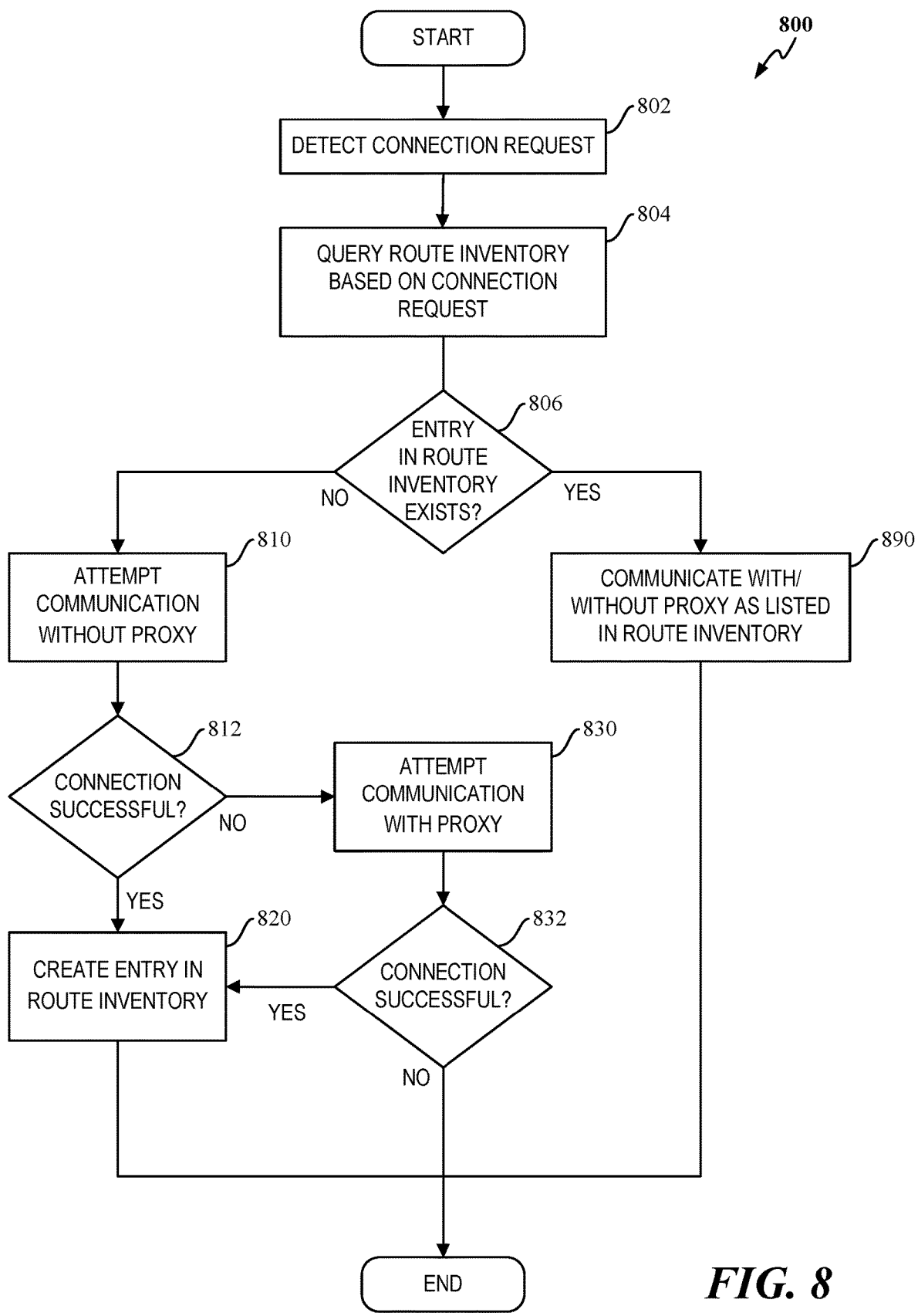
FIG. 8 is a flow diagram of a proxy communication determination approach using the proxy connection determination manager of FIG. 7.

The proxy connection manager 702 further includes a proxy route learning module 732 and a route inventory 734. In describing the proxy route learning module 732, reference will also be made to FIG. 8 that illustrates a proxy communication determination approach 800 configured in accordance with various aspects of the invention that provides for proxy configuration based on a try-and-learn approach where, starting at 802, a connection request from an object, including a service such as one of the plurality of services 712-1, 712-2, and 712-n is detected. Operation then continues with 804.

Figure 9:
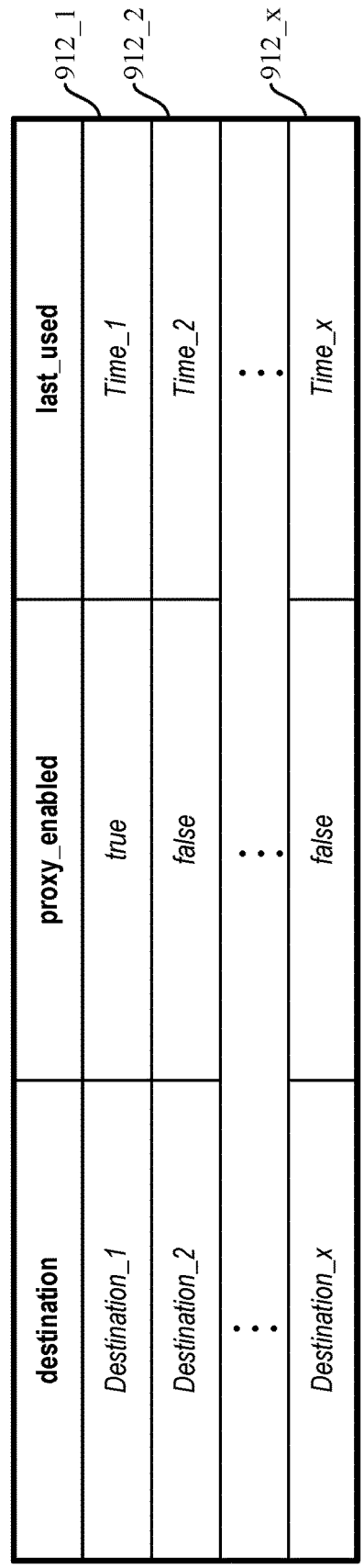
FIG. 9 is an example of a route inventory configured in accordance with an embodiment of the invention that may be used with the proxy connection determination manager of FIG. 7.

At 804, the proxy route learning module 732 performs a query of the route inventory 734 based on the connection request. FIG. 9 illustrates a route inventory 900 that may represent an example of the route inventory 734 at a particular time. In one embodiment of the invention, an entry in the route inventory 900 may be defined, on a per row basis, with the fields and values of:

```
{
    destination: {address},
    proxy_enabled: {true|false},
    last_used: {time}
}
``` where the destination field of {address} may be a CIDR/IP or a domain name; the proxy_enabled field of {true|false} may be a Boolean of true or false, where a value of true means that the proxy should be used and a value of false indicates that the proxy will not be used; and the last_used field of {time} may specify a particular time that the particular entry in the route inventory 900 has been used that is updated every instance that the particular entry has been used. The last_used field of {time} may also represent an elapsed time since the entry has been used. Various formats of the last_used field of {time} may be used, depending on the needs of a particular implementation, and those of ordinary skill in the art may appropriately configure the field suitably.

Continuing to refer to FIG. 9, the route inventory 900 includes a first route inventory entry 912_1 with a destination field having a value of Destination_1, a proxy_enabled field having a value of true, and a last_used field having a value of Time_1. The route inventory 900 also includes a second route inventory entry 912_2 with a destination field having a value of Destination_2, a proxy_enabled field having a value of false, and a last_used field having a value of Time_2. In the example, the route inventory 900 includes multiple entries that extend to a x-th route inventory entry 912_x with a destination field having a value of Destination_x, a proxy_enabled field having a value of false, and a last_used field of Time_x.

In accordance with another aspect of the invention, a criterion such as an object type may be used instead of the destination to determine if a connection should be proxied. Thus, the proxy route learning module 732 may learn by object type instead of a specific endpoint. In accordance with other aspects of the invention, one or more other criteria may be used.

At 806, if an entry in the route inventory 734 corresponding to the connection request exists, then operation continues to 890. Otherwise, operation continues to 810.

At 890, where the entry in the route inventory 734 that corresponding to the connection request exists, the connection proceeds in accordance with or without proxy as listed in the route inventory 734.

At 810, where no entry in the route inventory 734 that corresponding to the connection request exists, an attempt to communicate without proxy will be attempted. Operation will then proceed to 812.

At 812, it is determined if the connection without proxy is successful, then operation will continue with 820. Otherwise, if the connection with proxy is not successful, then operation will continue with 830.

At 820, where the connection without proxy is determined to be successful at 812, an entry in the route inventory 734 may be created based on the successful connection without proxy.

At 830, where the connection without proxy is determined to not be successful, an attempt to communicate with proxy will be made. In other words, the connection attempt is retried with proxy. Operation will then proceed with 832.

At 832, a determination will be made to determine if the connection with proxy is successful. If the connection with proxy is successful, then operation returns to 820, where an entry in the route inventory 734 may be created based on the successful connection with proxy. Otherwise, if the connection with proxy is unsuccessful, operation of the proxy communication determination approach 800 ends.

In general, no entry in the route inventory 734 is added if no attempt with or without proxy is successfully tried. In addition to the updates to the route inventory 734 performed based on the operation of the proxy communication determination approach 800, in one aspect of the invention, the route inventory 734 may be updated to automatically eliminate entries based on unused routes. For example, entries that are not used and/or updated after a specified time interval may expire.

In addition to the various aspects of the invention described above for configuring the proxy configuration 722, the proxy connection determination manager 702 also includes a user configuration module 726 that is configured to allow a user to update the proxy configuration 722, the proxy route learning module 732, and the route inventory 734. In one aspect of the invention, the user configuration module 726 allows the user to retrieve a current configuration and manually modify (e.g., add/delete/change) entries in either the route inventory 734 or the proxy configuration 722. In another aspect of the invention, the user configuration module 726 allows the user to modify the operation of the proxy route learning module 732. For example, the user configuration module 726 allows the user to modify the proxy route learning operation described by the proxy communication determination approach 800, such as ignoring any value in the last last_used field of the route inventory 900.

In accordance with various aspects of the invention, the object inventory 234 of FIG. 2 or the route inventory 734 of FIG. 7 may be stored in a database generally referred to as a "proxy database" or a "proxy inventory." The database may be pruned automatically or based on a triggering event, as described above. Further, although the inventories described above may include entries for both proxy and non-proxy communication listings, in accordance with various embodiments the inventories may only include proxy communication listings, or only include non-proxy communication listings. In other words, only communications listed in the inventory will use the proxy if the inventories only include proxy communication listings. In general, one preferred approach is to avoid using the proxy as that involves additional resources.

Figure 10:
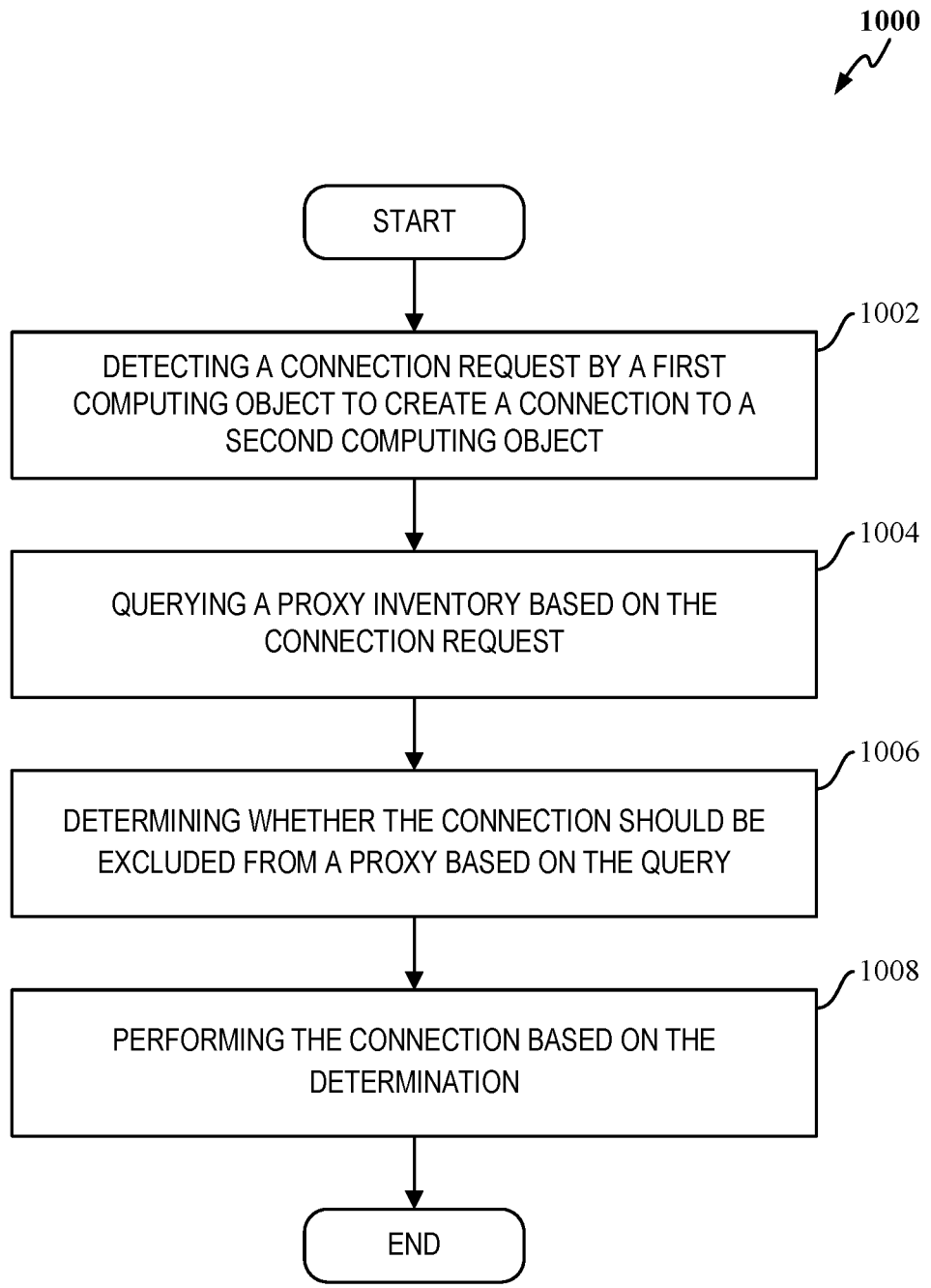
FIG. 10 is a flow diagram of an operation in a cloud architecture including a mixed network including local objects in a local network and external objects in an external network, wherein the external objects are accessed through proxy communications in accordance with various aspects of the invention.

A computer-implemented method in a cloud architecture including a mixed network comprising local objects in a local network and external objects in an external network, wherein the external objects are accessed through proxy communications in accordance with various aspects of the invention, is described with reference to a flow diagram 1000 of FIG. 10. At block 1002, a connection request by a first computing object to create a connection to a second computing object is detected. At block 1004, a proxy inventory based on the connection request is queried. At block 1006, whether the connection should be excluded from a proxy based on the query is determined. At 1008, the connection based on the determination is performed.

Although the operations of the approaches herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random-access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method in a cloud architecture comprising a mixed network comprising local objects in a local network and external objects in an external network, wherein the external objects are accessed through proxy communications, the method comprising:
    detecting a connection request by a first computing object to create a connection to a second computing object;
    querying a proxy inventory based on the connection request, wherein the proxy inventory comprises a plurality of entries corresponding to at least one of objects and destinations in the cloud architecture;
    determining whether the connection should be excluded from a proxy based on the query, including locating an entry in the plurality of entries specifying at least one of an object and a destination corresponding to the connection request, wherein the entry further specifies an option selected from a first option that the connection is to be proxied and a second option that the connection is not to be proxied; and
    performing the connection based on the determination.

2. The method of claim 1, wherein the proxy inventory comprises a plurality of entries corresponding to the objects in the cloud architecture, and wherein locating the entry in the plurality of entries includes locating the entry in the plurality of entries specifying the object corresponding to the connection request.

3. The method of claim 2, wherein at least one entry in the proxy inventory is associated with an object type.

4. The method of claim 2, wherein the proxy inventory comprises an inventory of all objects in the cloud architecture.

5. The method of claim 1, wherein the proxy inventory comprises a plurality of entries corresponding to the destinations in the cloud architecture, the method further comprising:

when the entry in the proxy inventory specifying the destination does not exist, attempting a communication without the proxy for the connection request;

when the communication without the proxy for the connection request is unsuccessful, attempting a communication with the proxy for the connection request; and creating a new entry in the proxy inventory when one of the communication without the proxy and the communication with the proxy is successful.

6. The method of claim 5, further comprising:

updating a time value associated with the entry, wherein the time value specifies a last used time.

7. A non-transitory computer-readable storage medium containing program instructions for determining proxy communications in a cloud architecture comprising a mixed network comprising local objects in a local network and external objects in an external network, wherein the external objects are accessed through proxy communications, wherein execution of the program instructions by one or more processors causes the one or more processors to perform steps comprising:

detecting a connection request by a first computing object to create a connection to a second computing object;

querying a proxy inventory based on the connection request, wherein the proxy inventory comprises a plurality of entries corresponding to at least one of objects and destinations in the cloud architecture;

determining whether the connection should be excluded from a proxy based on the query, including locating an entry in the plurality of entries specifying at least one of an object and a destination corresponding to the connection request, wherein the entry further specifies an option selected from a first option that the connection is to be proxied and a second option that the connection is not to be proxied; and performing the connection based on the determination.

8. The computer-readable storage medium of claim 7, wherein the proxy inventory comprises a plurality of entries corresponding to the objects in the cloud architecture, and wherein locating the entry in the plurality of entries includes locating the entry in the plurality of entries specifying the object corresponding to the connection request.

9. The computer-readable storage medium of claim 8, wherein at least one entry in the proxy inventory is associated with an object type.

10. The computer-readable storage medium of claim 8, wherein the proxy inventory comprises an inventory of all objects in the cloud architecture.

11. The computer-readable storage medium of claim 7, wherein the proxy inventory comprises a plurality of entries corresponding to the destinations in the cloud architecture and the execution of the program instructions by one or more processors further causes the one or more processors to perform steps comprising:

when the entry in the proxy inventory specifying the destination does not exist, attempting a communication without the proxy for the connection request;

when the communication without the proxy for the connection request is unsuccessful, attempting a communication with the proxy for the connection request; and creating a new entry in the proxy inventory when one of the communication without the proxy and the communication with the proxy is successful.

12. The computer-readable storage medium of claim 11, wherein the execution of the program instructions by one or more processors further causes the one or more processors to perform steps comprising:

updating a time value associated with the entry, wherein the time value specifies a last used time.

13. A system in a cloud architecture comprising a mixed network comprising local objects in a local network and external objects in an external network, wherein the external objects are accessed through proxy communications, the system comprising:

memory; and one or more processors configured to:

detect a connection request by a first computing object to create a connection to a second computing object;

query a proxy inventory based on the connection request, wherein the proxy inventory comprises a plurality of entries corresponding to at least one of objects and destinations in the cloud architecture;

determine whether the connection should be excluded from a proxy based on the query, including locating an entry in the plurality of entries specifying at least one of an object and a destination corresponding to the connection request, wherein the entry further specifies an option selected from a first option that the connection is to be proxied and a second option that the connection is not to be proxied; and perform the connection based on the determination.

14. The system of claim 13, wherein the proxy inventory comprises a plurality of entries corresponding to objects in the cloud architecture, and the one or more processors is configured to locate the entry in the plurality of entries specifying the object corresponding to the connection request.

15. The system of claim 14, wherein at least one entry in the proxy inventory is associated with an object type.

16. The system of claim 14, wherein the proxy inventory comprises an inventory of all objects in the cloud architecture.

17. The system of claim 13, wherein the proxy inventory comprises a plurality of entries corresponding to the destinations in the cloud architecture, and the one or more processors are further configured to:

when the entry in the proxy inventory specifying the destination does not exist, attempt a communication without the proxy for the connection request;

when the communication without the proxy for the connection request is unsuccessful, attempt a communication with the proxy for the connection request; and create a new entry in the proxy inventory when one of the communication without the proxy and the communication with the proxy is successful.

18. The system of claim 17, wherein the one or more processors are further configured to:

updating a time value associated with the entry, wherein the time value specifies a last used time.

* * * * *